March 8, 1966  M. E. CLYNES  3,238,767
ULTRASONIC PULSE-ECHO SYSTEM FOR INTERNAL EXPLORATION
Filed Dec. 11, 1962
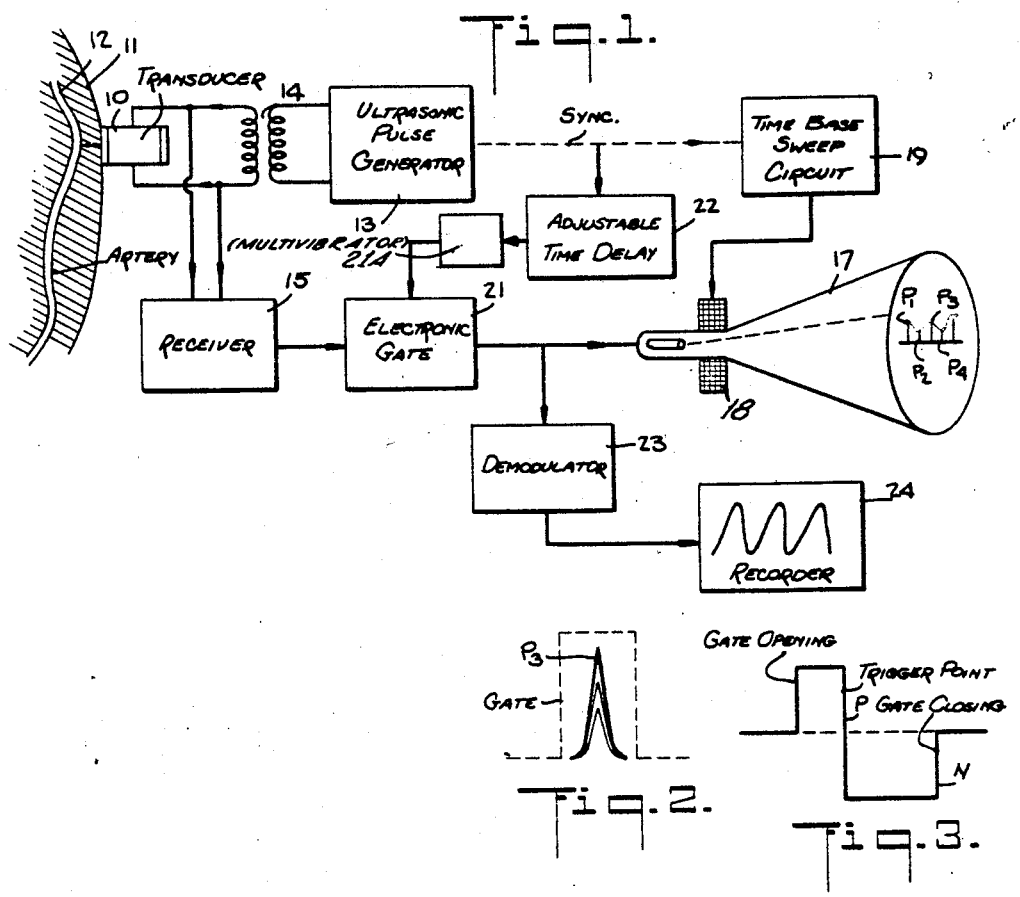
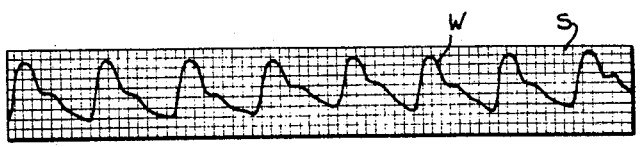
INVENTOR.
MANFRED E. CLYNES
BY
ATTORNEY

United States Patent Office 3,238,767
Patented Mar. 8, 1966

3,238,767
ULTRASONIC PULSE-ECHO SYSTEM FOR
INTERNAL EXPLORATION
Manfred E. Clynes, Palisades, N.Y.
Filed Dec. 11, 1962, Ser. No. 243,909
5 Claims. (Cl. 73—67.9)

This invention relates generally to ultrasonic techniques for exploring internal structure, and more particularly to ultrasonic pulse-echo techniques for exploring the internal structure of living organisms and adapted to indicate or record the pulsatory wave developed in various sections of the circulatory system.

Ultrasonic testing devices are widely used for locating flaws in solid pieces. Such inspectoscopes are adapted to transmit ultrasonic waves into the piece and to determine the presence of flaws therein by reflection or by an interception of the wave transmission through the piece. These devices are not only effective in sensing the presence of discontinuities or defects in solid bodies such as metal and glass objects, but they have also been applied to soft objects such as automobile tires.

In recent years attempts have been made to employ similar ultrasonic techniques in exploring the internal structure of living organisms. One important advantage of ultrasonics is that it is non-destructive and free of the hazards incident to the use of X-ray or gamma ray examination. Unlike X-ray, ultrasonics is also sensitive to changes in elasticity of tissue as well as changes in density. Further, pulse methods allow the depth from which an echo is reflected to be known, so that objects examined are also located in depth, unlike in X-ray examination.

It is known to use pulse-echo ultrasonic methods in combination with standard scanning procedures to produce patterns on a cathode ray viewing screen representative of the internal structure being scanned. In the pulse-echo ultrasonic technique, an ultrasonic beam of pulses generated by a transducer coupled to the body is directed along an internal path and echo pulses are received from reflecting structure along the path. If the echo pulses are displayed on an "A" type screen, such as used in sonar, the echo pulses from the different reflecting targets will be displayed as "pips" of varying height along the time base sweep line on the screen. The height of each pip is indicative of the relative reflectivity of the target, whereas the displacement of the pip with respect to the point of origin of the sweep line is indicative of the distance between the target and the transducer.

The principal object of the present invention is to make use of the pulse-echo ultrasonic technique as a means of exploring the circulatory system of a living body whereby a particular arterial or venous section of the system may be selected for examinaton and the pulsatory wave produced in the selected section may be displayed and recorded.

The circulatory system of the human body or of other living organisms is a highly complex network and the pulsatory action in different parts of the organism, as reflected in the pulse wave, is indicative of pathological conditions which may be restricted to such parts or areas. Heretofore, such examination has been limited to peripheral activity, as by the use of instruments making use of pressure-responsive transducers or other devices sensitive to the physical displacement of the body surface or body recoil resulting from pulsating activity. The slope of the ascending limb or leading edge of the pulse pressure wave is a function of the duration of the ventricular discharge, the cardiac output, the height of the diastolic pressure, and the distensibility of the peripheral circulatory system.

When the arteries are not peripherally accessible, no existing instrument is capable of observing the wave form derived from the rhythmic beating of the arteries due to successive contractions of the heart. Accordingly, it is a more specific object of this invention to provide a pulse-echo ultrasonic system adapted to direct a pulse beam along an internal path which includes an area or section of an artery, and to segregate echo pulses returned from the selection section from all other echoes, the amplitude of the segregated echo pulses varying as a function of the varying blood content in the selected section. A significant feature of the invention is that the segregated echo pulses may be demodulated to derive the amplitude envelope therefrom, thereby to produce a pulsatory wave form which may be indicated or recorded to provide a record of the pulsatory arterial activity.

While the invention will be described in connection with a black and white or single ultrasonic beam pulse-echo arrangement, it is to be understood that the same principles are applicable to a multiple-beam system as disclosed in my copending application Serial No. 211,730, now Patent No. 3,156,110, wherein color patterns or images are produced indicative of the internal structure.

In a system in accordance with the invention, a problem at times arises when the transducer producing the pulses is placed physically against the organism being examined, and is therefore subject to periodic displacement as a result of breathing motion. Hence the distance between the transducer and the reflecting structure, which ideally should be fixed, actually varies periodically.

Thus a further object of the invention is to provide an arrangement of the above-mentioned type for selecting particular echoes, which selection is compensated for variations in the distance between the transducer and the reflecting point due to respiratory displacement.

Briefly stated, these objects are accomplished in a pulse-echo ultrasonic system where in a beam of pulses is projected along an internal path and echo pulses are received from reflecting targets, such as arteries, organs, and the like. The echo pulses are fed through an adjustable gating circuit to a display device, the opening of the gate being initiated after a predetermined interval from the transmission of the ultrasonic pulses and remaining open for a brief period sufficient to pass a selected echo pulse, but excluding all other responses. Thus, by varying the time interval, the gate operation may be shifted to pick out any one of the echo pulses in the time period between successive transmission pulses, and to reject all others. The moment of gate initiation may also be adjusted to take into account variations in time resulting from respiratory movement. To determine the pulsatory wave form of a selected area of an artery, the echo pulses received from the selected area are amplitude-demodulated to derive the amplitude envelope therefrom, and the wave form so developed is recorded or otherwise indicated.

For a better understanding of the invention, as well as other objects and further features thereof, reference is made to the following detailed description to be read in conjunction with the accompanying drawing, wherein:

FIG. 1 is a schematic diagram of a simplified pulse-echo diagnostic system having selective gating in accordance with the invention to segregate echo pulses from an arterial section and to derive the wave form amplitude variations in said echo pulses;

FIG. 2 shows the selected echo pulses;

FIG. 3 is a wave form explanatory of the operation of the gating circuit; and

FIG. 4 is an example of a recording from an interior artery.

Referring now to FIG. 1, the system in accordance with the invention includes an ultrasonic transducer 10 which may take the form of barium titanate. This material behaves as an electrostrictive piezoelectric transducer adapted to convert radio-frequency energy into ultrasonic waves, or to convert ultrasonic waves into radiofrequency energy. Thus the transducer is capable of acting as an ultrasonic transmitting or detecting element. The transducer is coupled directly or by a fluid medium to a living organism 11 which includes an arterial channel 12 to be analyzed. In practice, the transducer may be housed in a small cylindrical casing and placed directly against the skin of the patient and coupled thereto by a suitable cream.

The transducer 10 is excited by means of a pulse generator 13 operating at a carrier frequency in the range, for example, of 1 to 10 megacycles, to produce an exploratory beam. The generator is coupled to the transducer through a coupling transformer 14. Echo pulses detected by the transducer are applied directly to a receiver 15 tuned to the carrier frequency of the associated generator to produce output voltage pulses whose magnitudes are proportional to the amplitude of the echo pulses.

The pulse generator operates at a repetition rate of, say, about 500 to 1000 pulses per second, each pulse being of microsecond duration, whereby a relatively long interval for echo pulse reception exists between successive pulses. In practice, the duration of each pulse may be in the order of five microseconds or even shorter, and should be made up of as few cycles of the carrier frequency as possible. In one actual embodiment, a unit was used having a pulse repetition rate of 1000 pulses per second, with a pulse duration of about two microseconds at two megacycles, the beam diameter being 1 cm.

It is desirable to reduce the ringing of the transmitter and receiver as far as possible in order to eliminate interference of the transmit signal and the echo signal with each other, and of the echo signals from various structures with each other. This can be accomplished by damping the transducer with plastic backing material and/or by providing an equal and opposite pulse to the transducer after, say, two cycles of the original pulse, which will serve to cancel the subsequent ringing of the transducer.

Assuming that the transducer 10 is beamed or focused along a path towards a particular region of internal structure, the presence of reflecting targets including the area of artery 12 intercepted by the beam results in echo pulses which will be picked up by the same transducer, the echo pulses returning at different points in time depending on their relative distance from the transducer, as in the case of sonar systems.

The output of the receiver 15 is applied to the intensity-modulation electrode 16 in the electron gun of a cathode ray oscilloscope 17. The electron beam from the gun is electromagnetically deflected in the horizontal and vertical planes by a common yoke 18. While electromagnetic deflection has been disclosed, it is to be understood that electrostatic means may be used for the same purpose.

To display the various echo pulses in the path of the beam along a base line, a time base saw-tooth wave generator 19 is coupled to the deflection yoke 18 to deflect the beam along a horizontal line. The time base generator is synchronized with pulse generator 13 so that the scanning sweep commences simultaneously with the transmission of the ultrasonic pulse.

As the electron beam is deflected, its intensity is modulated by the output of the receiver. Thus, as shown on the screen 20 of the cathode-ray tube 17, along the base line X a series of pips $P_1$, $P_2$, $P_3$ and $P_4$, etc., is presented, each representing a particular echo. The spacing between pips depends on the relative displacement between the reflecting objects in the irradiated path.

Thus the time of arrival of the echo pulse gives an indication of the spatial position of the echo-producing target. The amplitude of the echo pulses and hence the pips will depend on the characteristics of the reflecting structure with respect to the pulse frequency. For example, a bone will ordinarily produce a higher degree of reflectivity than an artery. Similar differences will occur for other internal elements of the human body, depending in a sense on their acoustic properties, very much as objects in an auditorium have different absorption or reflection qualities with respect to sound tones. But while static targets such as bones will produce echoes of constant amplitude, echo pulses received from an artery will vary in amplitude in the course of time as the blood content and diameter of the artery change with cardiovascular activity.

We shall assume that pips $P_1$, $P_2$ and $P_4$ represent static targets and hence have a constant amplitude, while pip $P_3$ represents an arterial section and hence has a varying amplitude. The pip $P_3$ is the only one of interest, and the first problem is to select this pip to the exclusion of all others.

In order to select pip $P_3$, there is interposed between the output of the receiver 15 and the electron gun 16, an electronic gate 21 which may be of the vacuum-tube or diode type and acts effectively as a switch which is actuated and remains open to pass echo pulses for a limited period. The gate, for example, may be an electronic switch which is normally biased to cut-off and is rendered conductive by the application of a square wave from a one-cycle multivibrator 21A, the width of the square wave determining the open time of the gate. The gate is opened by the application of a trigger pulse to the multivibrator, this trigger pulse being derived from the generator 13 through an adjustable time delay circuit 22.

Thus when a pulse is transmitted, a pulse is derived from generator 13 which reappears after a predetermined time interval in the output of delay circuit 22, this pulse initiating the operation of the gate. By varying the time interval, any echo pulse appearing in the interval between transmitted pulses may be selected for examination, and all other pulses rejected. In effect, therefore, the gate position may be shifted along the base line relative to the point of origin representing the instant of transmission. Thus, as shown in FIG. 2, wherein the dotted lines represent the gating interval and pulse $P_3$ the selected pulse from the arterial section, successive pulses $P_3$ will vary in amplitude as a function of the varying blood content and diameter of the artery or vein.

Thus appearing in the output of electronic gate 21 is a train of echo pulses $P_3$ having the same repetition rate as the repetition rate of the transmitted pulses, but displaced in phase therefrom to an extent determined by the distance between the internal reflecting target and the transducer, the echo pulses varying in amplitude as a function of the arterial activity. To derive the amplitude envelope of the echo pulses, they are fed through a demodulator 23 which may take the form of a passive filter network. The resultant pulsatory wave in the output of the demodulator will have a frequency of the heart rate and a wave shape depending on the cardiovascular action, and may be displayed by a conventional oscilloscope or applied to a suitable moving chart recorder 24 to provide a permanent record.

It is important to note that the measurement is not directly of the displacement of the artery and the corresponding shift in time of the echo, since these are very small, but the changes in amplitude of the echo at a constant time after transmission. This allows a composite echo to be received from the whole artery, or allows front and back echoes of larger arteries to be compositely demodulated, without the need for separate measurement of the motion of the front and back of the artery, from which pulsation would be computed. This would be difficult to do, since the movements involved are difficult to resolve accurately, and would also require two separate measures, the front and the back motion, to obtain variations in diameter.

In some cases it may be necessary to compensate for variations in the time position of the echo pulses relative to the gating interval resulting from periodic typical movements in the transducer because of breathing. If the transducer is coupled by a fluid medium to a patient under test, this does not occur in some applications, but if the transducer is placed directly against the body, the transducer is subject to the breathing motion of the body and the echo pulses tend to fluctuate accordingly.

Thus in the case of pulse $P_3$ in FIG. 2, if the transducer is physically reciprocated relative to the target, the pulse $P_3$ will move back and forth along the base line. To compensate for this effect, FIG. 3 shows an arrangement wherein a flip-flop circuit 25 is provided in conjunction with the electronic gate 21. The output wave of the flip-flop circuit is constituted, as shown in FIG. 3, by a rectangular positive pulse P (flip) followed by a rectangular negative pulse N (flop). The operation of the flip-flop circuit is controlled both by the electronic gate and by the output of a differentiating circuit 26, the differentiating circuit deriving from the echo pulses applied to the electronic gate, trigger pulses whose position corresponds to the peak of the echo pulses. The operation of the flip-flop circuit is initiated by the electronic gate 21, whereby the leading edge of the positive pulse P corresponds with the opening of the gate. The duration of the positive pulse P is determined by the trigger pulse taken from the echo pulse $P_3$, hence if the peak of echo pulse $P_3$ is centered within the gate interval, then the duration of the positive pulse P will be equal to the duration of the negative pulse N whose trailing edge corresponds to the instant of gate closing. If, on the other hand, because of a shift in the position of pulse $P_3$ within the gate interval the trigger point is also shifted, then the positive and negative pulses P and N will be of unequal duration depending upon the extent and direction of shift in $P_3$.

The output of the flip-flop circuit 25 is fed to a demodulator 27 which averages the output of the flip-flop circuit and produces a zero output only when the negative and positive portions of the flip-flop output are of equal duration. When, however, the negative and positive flip-flop pulses are unequal, a direct-current output will be produced whose magnitude and polarity depend on the relative inequality between the positive and negative-going portions of the flip-flop wave.

The direct-current output of demodulator 27 is applied to the electronic gate as a varying bias to shift its operating interval so as to maintain the echo pulses $P_3$ centered therein as these pulses shift back and forth relative to the base line.

In summary, in an instrument in accordance with the invention, ultrasonic pulses are directed as a beam in the direction to be viewed, and echoes are produced from biologic structures which present a different acoustic impedance to the travelling pulses. Measurements are based on the amount of time for any echo to return and/or the amplitude variation of the echo relative to the transmitted pulse. An electronic gate determines the depth of the area under study, only those echoes arriving within a selected time being accepted. Thus for receiving pulsations of internal arteries, the depth control is set to accept pulses from the area including the artery being examined. These echoes are demodulated, making use of the variations in phase as well as in amplitude. The result is an analog signal W which reproduces the time course of pulsation on a strip chart S.

In interpreting the records of these pulsations, called "Somagraphs," the arterial walls may be considered as acting as their own strain gauge. An example of a recording from an interior artery (Arteria princeps pollicis) is shown in FIG. 4.

An instrument in accordance with the invention is capable of measuring and recording the dimensions and position of deep-lying internal structures and organs, as well as movements and pulsations inside a living body. It is useful, for example, for measuring and recording pulsations of internal arteries supplying the various organs, as well as minor arteries, and the movement of the heart's valves and walls.

In effect, the instrument creates a window into the living body for precise physiological measurements, and may be used to determine the brain's mid-line as well as the dimensions of internal structures and cavities, including pelvic openings.

While there have been shown preferred embodiments of the ultrasonic pulse-echo technique according to the invention, it will be appreciated that many changes and modifications may be made therein without, however, departing from the essential spirit of the invention as defined in the annexed claims.

What is claimed is:
1. In an ultrasonic system for internal exploration, the combination of:
   (a) means projecting a beam of ultrasonic pulses through a body in a direction to be explored,
   (b) means receiving echo pulses returned from elements within said body intercepting said beam,
   (c) means to indicate said echo pulses,
   (d) gating means interposed between said receiving and indicating means to limit said indications to echoes returning from a pulsating element at a particular depth within said body, said selected echoes having a predetermined time position relative to the projected pulses and varying in amplitude due to the pulsations,
   (e) means responsive to the echoes of varying amplitude to demodulate same to produce an analog voltage representing the amplitude variations thereof, and
   (f) means coupled to said demodulating means to indicate said analog voltage.

2. A system as set forth in claim 1, wherein said means to indicate said analog voltage is constituted by a recorder which is responsive to said analog voltage to represent same as a function of time.

3. In an ultrasonic system as set forth in claim 1, wherein said ultrasonic beam has a frequency of 1 to 10 megacycles.

4. An ultrasonic system for measuring the pulsatory action of an organic element in a living body, comprising a periodic ultrasonic pulse generator including a transducer to be coupled to the exterior surface of said body to project a beam of pulses through said body in a direction intercepting said element, means coupled to said transducer to receive echoes returned from elements in said body intercepting said beam including said pulsatory element, means to demodulate said echoes to produce analog signals thereof, and gating means interposed between said detection means and said demodulation means to eliminate all echoes but those emanating from said pulsatory element, whereby a demodulated signal is produced which is an analog of the action of said pulsatory element.

5. An ultrasonic system for measuring the pulsatory action of an organic element within a living body, comprising a periodic ultrasonic generator including a transducer to be coupled to the exterior surface of said body to project a beam of periodic ultrasonic pulses therethrough in a direction intercepting said pulsatory element among others, a receiver coupled to said transducer to detect echoes returned from said intercepting elements in the intervals between said periodic pulses, an indicator coupled to said receiver to display said echoes in the order of their return during said intervals, a gating device interposed between said indicator and said receiver to limit communication therebetween to a predetermined fraction of each interval between successive periodic pulses, adjustable timing means responsive to said generator and coupled to said gating device to actuate same at an instant having a predetermined time displacement relative to the generation of an ultrasonic pulse, whereby only the echoes from said pulsatory element are applied to said indicator, and means coupled to said gating device to demodulate said echoes to provide an analog signal.

References Cited by the Examiner

UNITED STATES PATENTS

| | | | |
|---|---|---|---|
| 2,763,153 | 9/1956 | Simjian | 73—67.8 |
| 2,969,671 | 1/1961 | Sproule | 73—67.9 |
| 3,023,611 | 3/1962 | Howry | 73—67.8 |
| 3,041,872 | 7/1962 | Brown et al. | 73—67.9 |
| 3,086,390 | 4/1963 | Brown | 73—67.8 |

OTHER REFERENCES

Article entitled "Ultrasonic Automation—The Autosonic System," in April 1957 issue of Instrument Practise, pages 353–356.

RICHARD C. QUEISSER, *Primary Examiner.*

JOHN P. BEAUCHAMP, *Examiner.*